US006654230B1

United States Patent
Jones et al.

(12)
(10) Patent No.: US 6,654,230 B1
(45) Date of Patent: Nov. 25, 2003

(54) ROTATIONAL WRIST PAD OPERABLY LINKED TO EXTENDABLE LEGS OF A COMPUTER HAVING A BACKSIDE SURFACE CONFIGURED FOR FLUSH STORAGE OF THE WRIST PAD

(75) Inventors: Jeffrey Allen Jones, Round Rock, TX (US); Alvaro Sanchez-Cifuentes, Round Rock, TX (US)

(73) Assignee: International Business Machines Corp., Armonk, NY (US)

( * ) Notice: Subject to any disclaimer, the term of this patent is extended or adjusted under 35 U.S.C. 154(b) by 22 days.

(21) Appl. No.: 10/138,891

(22) Filed: May 2, 2002

(51) Int. Cl.[7] .............................................. F16M 13/00
(52) U.S. Cl. ....................... 361/680; 361/683; 248/118; 206/320; 400/691
(58) Field of Search ................................. 361/680, 683, 400/691, 713, 714, 719, 715, 472, 488, 489, 692; 248/118.1, 118.3, 118.5, 918, 346, 345.1, 678, 917, 442.2, 444.1, 449, 451–454, 650, 923; 312/208.2, 208.4, 223.1–223.7; 206/45.28, 305, 320, 576

(56) References Cited

U.S. PATENT DOCUMENTS

| 5,341,929 A | * | 8/1994 | Stefancin, Jr. ............... 206/320 |
| 5,346,164 A | * | 9/1994 | Allen .......................... 248/118 |
| 5,375,800 A | * | 12/1994 | Wilcox et al. ............ 248/118.1 |
| 5,490,036 A | * | 2/1996 | Lin et al. .................... 361/680 |
| 5,570,268 A | | 10/1996 | Selker |
| 5,596,481 A | | 1/1997 | Lin et al. |
| 5,596,482 A | | 1/1997 | Horikoshi |
| 5,818,360 A | * | 10/1998 | Chu et al. ...................... 341/22 |
| 5,835,342 A | * | 11/1998 | Hunte ......................... 361/681 |
| 5,971,332 A | | 10/1999 | Sun et al. |
| 6,025,986 A | * | 2/2000 | Sternglass et al. .......... 361/680 |
| D432,538 S | | 10/2000 | Van Note et al. |
| 6,341,061 B1 | * | 1/2002 | Eisbach et al. ............. 361/687 |

* cited by examiner

Primary Examiner—Michael Datskovsky
(74) Attorney, Agent, or Firm—Kevin L. Daffer; Conley Rose P.C.; Marilyn S. Dawkins

(57) ABSTRACT

A mounting apparatus is disclosed to allow a wrist pad to be rotationally mounted to a forward end of a computer. The wrist pad is operably coupled to a leg near the rearward end of the computer. Rotation of the wrist pad causes a linkage to draw the leg inward into the computer or extend the leg outward from the computer. The wrist pad can be placed in a storage configuration against an exterior surface of the computer or the wrist pad can be placed in a configuration in front of the computer or on top of a keyboard when the computer is opened and configured for use. Placing the wrist pad in at least two operable positions gives the user flexibility in relieving pressure points along the user's lower arm and hand area. Also, placing the wrist pad in a storage configuration makes the exterior surface of the stored pad coplanar with the exterior surface of the computer. Accordingly, one surface of the computer has an angled or beveled surface to accommodate the stored wrist pad and to abut with a working surface when the leg or legs are extended.

23 Claims, 3 Drawing Sheets

ROTATIONAL WRIST PAD OPERABLY LINKED TO EXTENDABLE LEGS OF A COMPUTER HAVING A BACKSIDE SURFACE CONFIGURED FOR FLUSH STORAGE OF THE WRIST PAD

BACKGROUND OF THE INVENTION

1. Field of the Invention

This invention relates to computers and more particularly to a computer having a pad that can be rotated about an axis near the front of the computer and a pair of support legs that extend from the computer during times when the wrist pad is rotated to one or more pre-defined positions.

2. Description of the Relevant Art

The following descriptions and examples are not admitted to be prior art by virtue of their inclusion within this section.

There are many types of personal computers on the market. Due to the mobility of our society, an increasing popular form of personal computer is the portable computer, often referred to as a notebook computer or laptop computer.

A portable computer has many of the advantages of the non-portable variety, with the additional advantage of being relatively lightweight and storable in a low profile configuration. In addition to its portable features, notebook or laptop computers generally employ a keyboard configured similar to non-portable computers. The keyboard generally has a QWERTY layout, where keys may be slightly elevated from the keyboard surface.

Repeated finger movements upon the keys of a computer keyboard may cause significant trauma to the hands, wrists, and general arm area of a user. In an attempt to alleviate some such problems, manufacturers often recommend the use of a pad. The pad can be placed in many different locations depending upon the user's desires. Typically, the pad is placed near a forward surface of the keyboard. The user can then rest a portion of his or her arm upon the pad, thus, preventing the user from having to hold the weight of the arm area while typing upon the keyboard.

In some instances, a user may wish the pad to rest on the upper surface of the keyboard directly in front of the keys. In other instances, a user may wish the pad to reside separate from the keyboard, yet directly in front of the keyboard. The adaptability of the pad location depends on where the user desires to alleviate pressure points along the arm area (including the palm, wrist, or forearm area).

Conventional pads are not easily positioned around a forward surface of a keyboard. Typically, the pad remains fixed either on the forward surface of the keyboard or just in front on the keyboard. This problem is compounded with the advent of portable computers. While it is recognized that a pad is desirable to raise the user's arm area, portable computers generally do not make available a pad integrated with the computer, much less a pad that can be configured at several positions near the forward surface of a portable computer keyboard.

It would be desirable to introduce a portable computer which can place a pad at several locations near the forward surface of the computer during operation. It would also be desirable to place the pad in a storable position also near the forward surface, but flush with the backside surface of the computer so that the portable computer can be closed completely when not in operation, yet the backside surface appears as a single planar element for ease of carrying, storage, etc. Yet further, it would be desirable for such an improved computer to couple the movement of the pad to legs near the rearward surface of the computer such that when the pad is placed in an operable position, the legs will extend from the computer automatically. These features, while absent from conventional portable computers, would present all the advantages of using a variably placed pad on portable computers which have enjoyed a substantial market share in the computer industry.

SUMMARY OF THE INVENTION

The problems outlined above are in large part solved by a rotational pad. The pad is rotational about a forward surface of the computer and can be placed in multiple positions about the forward surface. As recognized herein, the forward surface is the surface facing the user when the computer is called upon for data entry.

Rotational movement of the pad (hereinafter referred to as a wrist pad, palm pad, hand pad, arm pad, or any other such pad which a user can rest one or more portions of his or her body during keystroke operation) is operably connected to one or more legs extendable from a rearward surface of the computer. As the pad is rotated from a storage position when the portable computer is opened, a linkage coupled between the pad and the legs causes a reciprocal movement of the pad to translate to the legs. Thus, as the pad is moved to a position on which a user can rest his or her arm, wrist, or palm, the linkage draws one or more legs from a storage position within the computer to an extendable position downward from the computer.

Rotational movement of the pad allows the user to place a pad in different configurations depending upon how the operator will be using his or her computer keyboard. For example, the pad can be rotated and placed on the upper surface of the keyboard if the user will be activating elements near the backside surface of the keyboard. However, the pad can be placed in front of the keyboard, and separate from the keyboard, if the user will be activating elements near the frontside surface of the keyboard such as, for example, the mouse.

Preferably, at least one leg extends downward from the computer during use. More preferably, two legs extend downward from the computer near opposed sides of the computer near the rearward surface of the computer. When the computer is open and available for data entry, the pad either rests on the surface of the computer adjacent the keyboard or extends in front of the keyboard surface. In either instance, the leg or legs extend downward against a working surface on which the computer is placed. The working surface can be a desktop, tabletop, user lap, or any other such surface on which the computer resides during times when the user actuates the keyboard, built-in mouse, or other such entry devices near an upward-extending surface of the computer.

Preferably, the distal ends of one or more legs in combination with only a portion of the bottom surface of the computer form a plane. That plane is designed to rest upon a working surface and, therefore, the other portion of the bottom surface which is not within that plane does not abut with the working surface.

According to one embodiment, a computer wrist pad mounting apparatus Is provided. The wrist pad mounting apparatus includes a wrist pad, a leg, and a linkage coupled between the wrist pad and the leg. The wrist pad is adapted to rotate to a predefined position. The linkage responds to the rotation of the wrist pad and causes the leg to extend during times when the wrist pad is rotated to the predefined position. The wrist pad can rotate from a storage position to a position in front of the keyboard or a position on top of the keyboard surface. As such, the wrist pad can rotate in excess of 180° and, more preferably, in excess of 200° when rotated its full rotational amount.

According to yet another embodiment, a computer is provided. The computer includes a pad rotational about a forward surface of the computer. The computer also includes a leg in operable communication with the pad. The leg extends from the computer near a rearward surface of the computer whenever the pad is rotated to a certain position. Thus, the leg (or, when two more legs are at the rearward surface, legs) extends whenever the pad is drawn from the storage position near the bottom surface of the computer to a position extending in front of the computer or a position at the front of the computer abutting with an upper surface of the keyboard.

According to yet another embodiment, a method is provided. The method involves the steps of opening a laptop computer. When opening a laptop computer, the computer screen is unfolded from the keyboard. Thereafter, a wrist pad is rotated from a backside surface of the keyboard to a frontside surface of the keyboard. As the wrist pad is rotated, one or more legs from the backside of the keyboard are extended. As noted herein, the backside surface of the keyboard is generally regarded as the surface on which the computer rests during its operation and the frontside surface of the keyboard is the surface on which keys exist.

BRIEF DESCRIPTION OF THE DRAWINGS

Other objects and advantages of the invention will become apparent upon reading the following detailed description and upon reference to the accompanying drawings in which.

Figure 1:
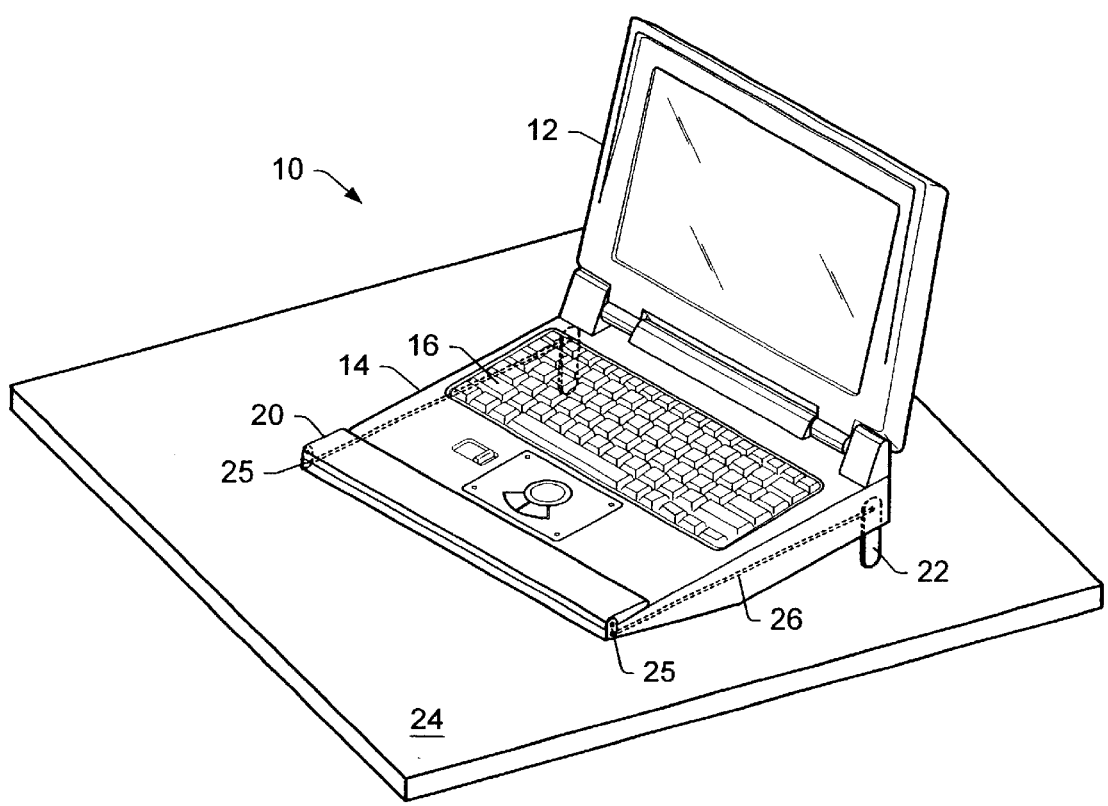
FIG. 1 is a front and side isometric view of a computer with the wrist pad placed in a first position adjacent a keyboard for user-operation of the computer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates a computer 10. Computer 10 is preferably a portable computer having an electronic display 12 pivotably coupled to a keyboard 14. Keyboard 14 includes a housing that contains various internal components of computer 10. Placed on one surface of keyboard 14 is a plurality of keys 16 which can be arranged in many different configurations, for example, the keys can be arranged according to a QWERTY configuration. Also included on the surface which bears keys 16 may be a pointing device 18, such as a mouse.

FIG. 1 illustrates computer 10 configured so that a user can access keys 16 and pointing device 18 through normal operation of the computer. By virtue of its operating configuration, a pad 20 is rotationally mounted on a forward surface of computer 10 and, more particularly, a forward surface of the chassis of keyboard 14. The operating mode entails a user's wrist or lower arm area resting upon pad 20 as the user strikes one or more keys 16. By placing pad 20 on the upper surface of keyboard 14 as shown, the upper portions of the user's wrist, such as the user's palm, rest upon pad 20 as keys are actuated. It may be desirable, however, that pad 20 be placed further down the user's arm and away from the wrist area. Thus, pad 20 can be rotated from the upper surface of keyboard 14 to a position in front of keyboard 14—altogether separate from and not necessarily in abutment with keyboard 14. By rotating pad 20 to a position further in front of keyboard 14, a user can selectively rest different portions of his or her upper arm against pad 20 while typing.

Figure 2:
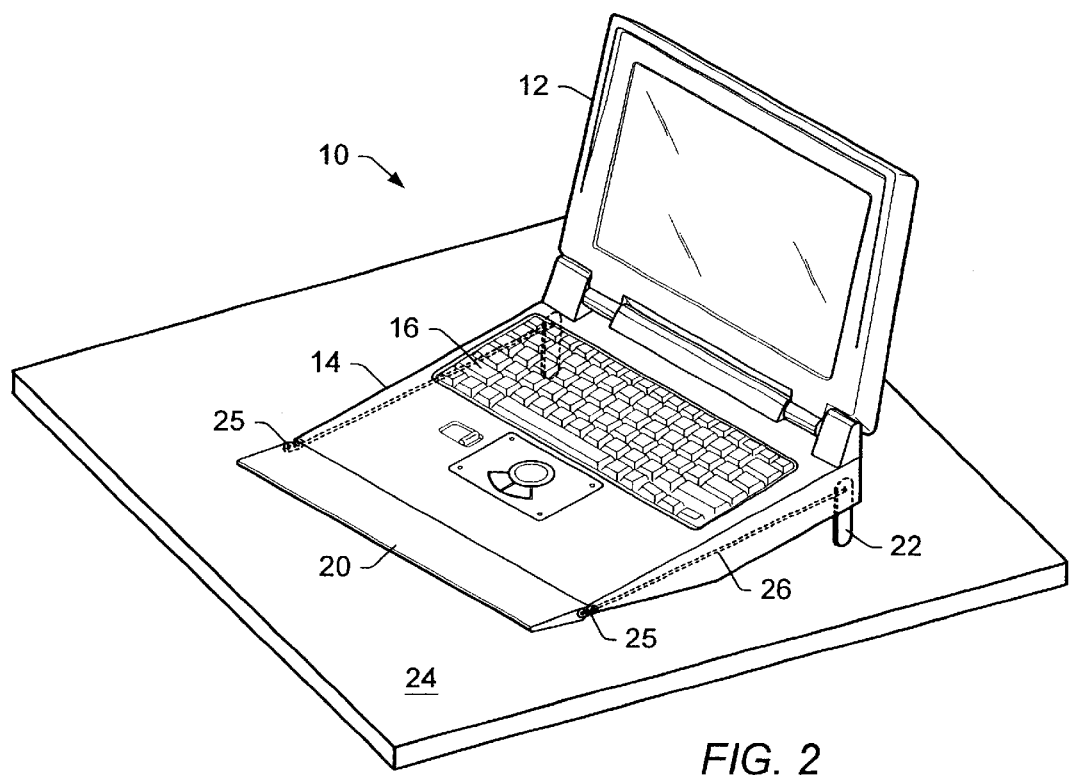
FIG. 2 is a front and side isometric view of the computer with the wrist pad placed in a second position extending forward of the keyboard for user-operation of the computer.

FIG. 2 illustrates the rotation of pad 20 in order to achieve a different "rest" position. Pad 20 is shown rotated about an axis and placed in a position in front of keyboard 14. If the user experiences pain higher up the wrist area, then the pad configuration of FIG. 2 would be more conducive to relieving such pain than the configuration of FIG. 1. The benefit of selectively placing pad 20 arises from making pad 20 rotational about an axis which extends along the forward surface of keyboard 14.

FIGS. 1 and 2 illustrate pad 20 placed in two different positions depending upon the desires of the user. In either position, however, at least one leg 22 and, preferably, two legs (the latter leg shown in phantom) 22 extend downward against working surface 24. Working surface 24 includes any surface on which computer 10 can reside during its operation, examples of such are a tabletop, desk, or the lap of a user.

Referring again to FIGS. 1 and 2, coupled between one end of leg 22 and a bracket 25 is a linkage 26. Linkage 26 is preferably a rigid member that extends along a side of keyboard 14 preferably slightly inside the chassis itself. Linkage 26 is movable within the chassis preferably near both sides and thereby couples brackets 25 on each end of pad 20 to corresponding ends of a pair of legs 22. Linkage 26 moves back and forth along the sides of keyboard 14 and thereby corresponds to rotational movement of bracket 25. As pad 20 is drawn to the positions shown in FIGS. 1 and 2, linkage 26 is pulled toward the forward surface of keyboard 14 which, correspondingly, pulls the upper end of leg 22 toward the forward surface, for example, then the lower surface will extend from the bottom of keyboard 14 as linkage 26 is drawn forward.

Figure 3:
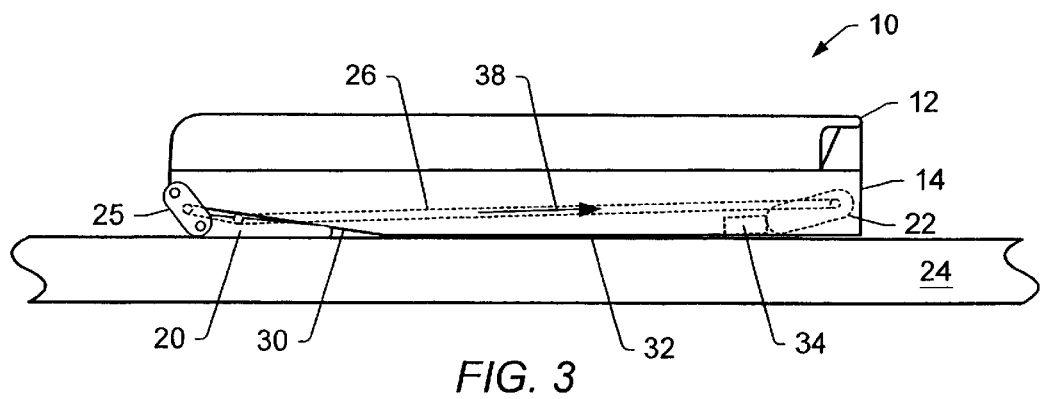
FIG. 3 is a side elevation view of the computer closed in a storage configuration with wrist pad rotated from the first and second positions to a third position flush with an exterior surface of the computer wherein the support legs are retracted.

FIG. 3 illustrates computer 10 in a closed or stored position. Display 12 is closed upon keyboard 14. Additionally, pad 20 is rotated to a position such that a surface of pad 20 abuts with a lower surface or exterior/exposed surface of keyboard 14. The lower surface of keyboard 14 is, therefore, shown having a first planar surface 30 and a second planar surface 32. Surface 30 is angled relative to surface 32 a predefined amount. The amount of that angle is determined by the width of pad 20. To gain a perspective of the amount of such an angle, computer 10 is shown resonant upon working surface 24. In its storage configuration, computer 10 certainly need not be placed upon a working surface. However, the working surface illustrates that the angle of first surface 30 relative to second surface 32 ensures that when pad 20 is placed in a storage configuration, the lower surface of pad 20 is coplanar with the second surface 32. Therefore, the storage configuration presents a substantially planar surface on both exposed and opposite surfaces.

In addition to illustrating the significance of the first and second surfaces 30 and 32, FIG. 3 also demonstrates a cam arrangement of linkage 26 relative to bracket 25 and leg 22. Rotation of pad 20 from its storage position shown in FIG. 3 to either the first or second positions shown in FIGS. 1 and 2, respectively, causes linkage 26 to extend forward and leg 22 to force against stop 34. Stop 34 thereby forces leg 22 to extend through an opening in the second surface 32 near the rearward surface of keyboard 14. Similar to linkage 26, stop 34 is preferably internal to the chassis of keyboard 14. Arrow 38 demonstrates the translational movement of linkage 26 as pad 20 and, correspondingly, bracket 25 are moved from their positions shown in FIGS. 1 and 2 to the position shown in FIG. 3. Accordingly, linkage 26 is drawn rearward thereby causing leg 22 to be retracted within the chassis or housing of keyboard 14. A biasing mechanism can be used to assist in drawing the lower portion of leg 22 upward, if necessary. However, as linkage 26 is drawn forward whenever pad 20 is placed in an operating position (versus a storage position), the biasing force of the biasing member is overcome as the lower portion of leg 22 is forced against stop 34 and, thereafter, downward to an extended position.

Referring to FIGS. 1, 2, and 3, it is recognized that, for sake brevity and clarity, the drawings are not necessarily shown to scale. For example, the first portion is recognized to be substantially the same length as the first portion of the pad, even though FIGS. 1 and 2 show the first portion 30 being somewhat longer than the length of the pad. It is desirable, however, that the first portion 30 be approximately or slightly longer than, but not much longer than, the first surface of the pad. In this fashion, when the pad is placed in the storage configuration, the tip of the pad 20 and the beginning of the second portion 32 is relatively small. In this manner, the pad and second portion form a co-planar, singular surface with little gap therebetween.

Figure 4:
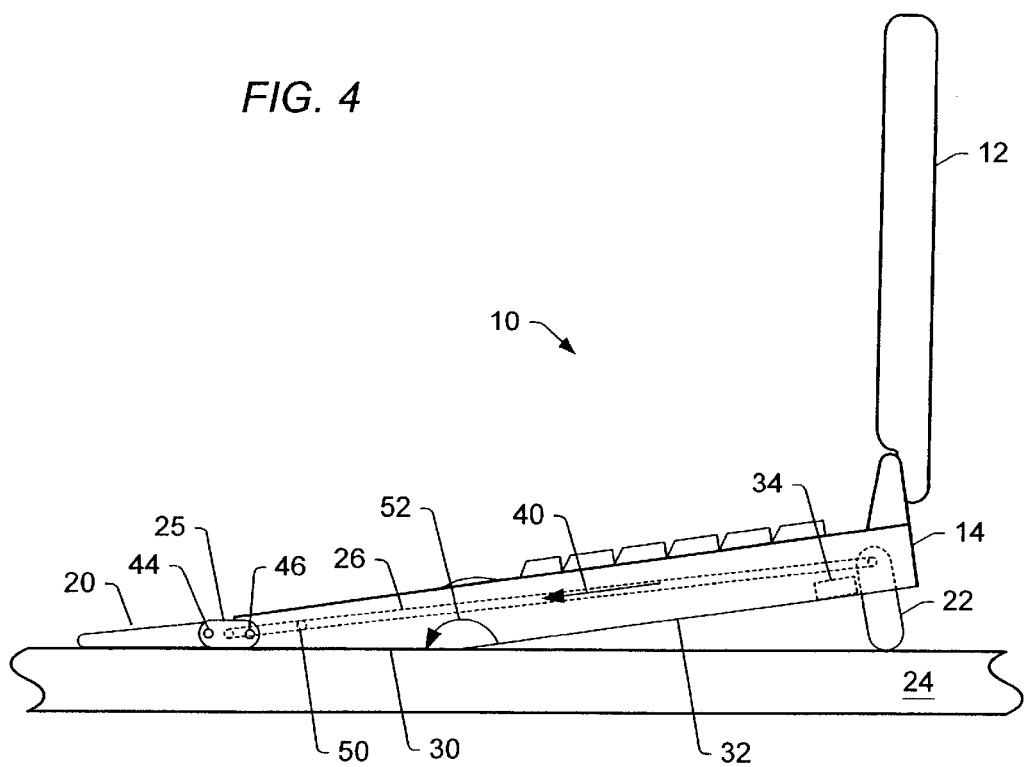
FIG. 4 is a side elevation view of the computer detailing the wrist pad placed in the second position and the operable coupling of the support legs to the rotational bracket on which the wrist pad is coupled.
Figure 5:
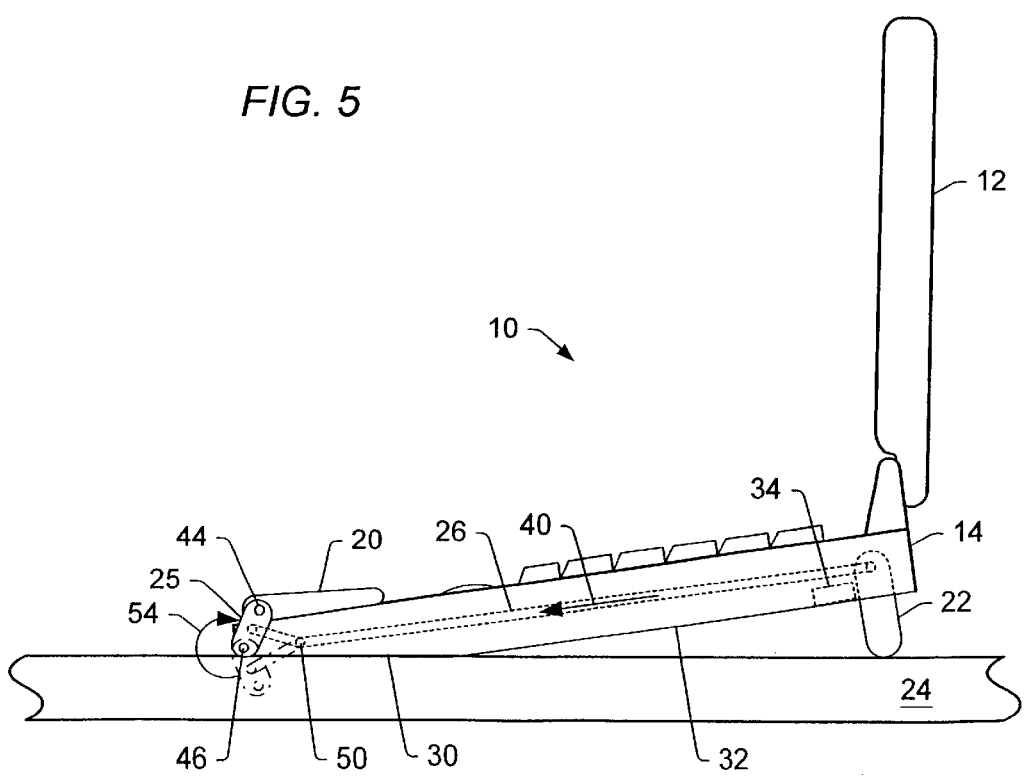
FIG. 5 is a side elevation view of the computer detailing the wrist pad placed in the first position and the operable coupling of the support legs to the rotational bracket on which the wrist pad is coupled.

FIGS. 4 and 5 illustrate different positions at which pad 20 can be rotated. When placed in either position, linkage 26 is drawn forward in the direction of arrow 40 thereby causing the upper end of leg 22 to be forced forward. The reciprocal motion on the lower end of leg 22 will force leg 22 against stop 34 and slides downward against one edge of stop 34 so that the lower end of leg 22 extends from the lower surface of keyboard 14 and, more preferably, the second surface 32 of keyboard 14.

Pad 20 is rotational about an axis and, more particularly, is rotational about two pins, for example. Pad 20 rotates about a first pin 44 which coupled pad 20 to bracket 25. Additionally, bracket 25 rotates about another pin 46 which couples bracket 25 to the forward surface of keyboard 14. Pins 44 and 46 extend a spaced distance from each other, yet parallel to each other along the forward surface of keyboard 14. Each bracket can, therefore, have two pins of relatively short distance which extend along the entire forward surface.

In addition to the differing positions of pad 20 shown in FIGS. 4 and 5, linkage 26 is also shown having a pivot point 50 about which two portions of linkage 26 rotate. Pivot 50 may be used to account for a slight up-and-down movement of the center point of bracket 25 to which one end of linkage 26 is connected. Not only does pivot 50 allow pivotal connection, but the end of linkage 26 connected to bracket 25 also allows pivot connection. As pad 20 is drawn upward as shown in FIG. 5, bracket 25 center point translates upward versus its downward position when pad 20 is placed in a storage configuration (see FIG. 3).

FIG. 4 illustrates the angle at which the first surface 30 extends to the second surface 32. Angle 52 is shown as an obtuse angle preferably near yet slightly less than 180°. According to one example, angle 52 is approximately 150°–170° and, more preferably, between 155° and 165°, for example. In this manner, the combination of first surface 30 and the distal ends of leg 22 reside upon working surface 24 absent any contact by second surface 32. The degree of surface area 30 can be made adjustable relative to the second surface 32. The amount of first surface to second surface is dependent upon angle 52 as well as the amount by which leg 22 extends outward from keyboard 14. The amount of the first surface must be chosen sufficient so that computer 10 is stable upon working surface 24 when in use.

FIG. 5 illustrates the rotational angle by which pad 20 can be rotated about axis 46. Angle 54 is shown to exceed 180°. Specifically, angle 54 is shown illustrative of the rotation of bracket 25 and it is understood from the drawings that when comparing FIG. 5 to FIG. 3, the amount by which pad 20 rotates about axis 46 is significantly more than the rotational amount of bracket 25 if, indeed, a two-pin configuration is used. Thus, the rotation of bracket 25 about axis 46 exceeds 180° and, more preferably, exceeds approximately 200°, whereas the amount of rotation of pad 20 exceeds 180° and, more preferably, exceeds 260°.

While bracket 25, legs 22, and linkage 26 are preferably made of rigid material, pad 20 is made of a pliable material. For example, pad 20 can be made of a foam substance, a cloth, rubber, vinyl, or any other material which will slightly conform to and provide cushion of a user's lower arm area, including the wrist and palm. The material chosen for bracket 25, linkage 26, and legs 22 in addition to being fairly rigid, should also be preferably lightweight. Any materials which have such properties are herein contemplated.

It will be appreciated to those skilled in the art having the benefit of this disclosure that the embodiments described are believed applicable to any computer, preferably a portable computer. Various architectures, components, compositions, and configurations which produce the advantages discussed herein are set forth in the present specification. Accordingly, the specification and drawings are to be regarded in an illustrative rather than a restrictive sense as to possibly numerous modifications which fall within the spirit and scope of the present invention.

What is claimed is:

1. A computer wrist pad mounting apparatus, comprising:
    a wrist pad adapted to rotate to a pre-defined position;
    a leg; and
    a linkage coupled between the wrist pad and the leg for extending the leg during times when the wrist pad is rotated to the pre-defined position.

2. The apparatus as recited in claim 1, wherein the wrist pad is adapted for rotation in excess of 180°.

3. The apparatus as recited in claim 1, wherein the wrist pad is rotationally coupled about a first axis to a bracket, and the bracket is rotationally coupled about a second axis to a forward surface of a computer.

4. The apparatus as recited in claim 3, wherein the first axis and the second axis extend along the forward surface parallel to one another.

5. The apparatus as recited in claim 1, wherein the pre-defined position is proximate an upper surface of a computer.

6. The apparatus as recited in claim 1, wherein the pre-defined position is an extension of a forward surface of a computer.

7. The apparatus as recited in claim 1, wherein the linkage is further adapted to retract the leg during times when the wrist pad is rotated to another pre-defined position proximate a lower surface of a computer into which the leg is retracted.

8. A computer, comprising:
- a pad having opposed first and second surfaces rotational about an axis that extends along a forward area of the computer; and
- a first portion and a second portion of a backside surface of the computer, wherein the first portion abuts with the first surface of the pad and the second surface is substantially co-planar with the second surface of the pad.

9. The computer as recited in claim 8, wherein the first and second portions extend in an obtuse angle relative to each other.

10. The computer as recited in claim 8, wherein the first and second surfaces extend in an acute angle relative to each other.

11. The computer as recited in claim 8, wherein the computer comprises a keyboard on a frontside surface of the computer, and wherein the backside surface is opposite the frontside surface.

12. The computer as recited in claim 8, wherein the first portion abuts with the first surface of the pad during times when the computer is configured for storage.

13. The computer as recited in claim 12, wherein the computer is configured for storage when a keyboard is pivotally collapsed onto an electronic display.

14. The computer as recited in claim 8, further comprising a leg is operable communication with rotation of the pad about the axis.

15. The computer as recited in claim 8, further comprising a leg adapted for retraction beneath the second portion of the backside surface during times when the first surface abuts with the first portion of the backside surface.

16. The computer as recited in claim 8, further comprising a leg adapted for extension from the second portion of the backside surface during times when the first surface is drawn from abutment with the first portion.

17. The computer as recited in claim 16, wherein a distal end of the leg and the first portion form substantially all surfaces of which the computer rests upon a working surface.

18. The computer as recited in claim 16, wherein the first portion and not the second portion rests upon a working surface during times when the leg extends from the second portion.

19. A method for opening a laptop computer, comprising:
- unfolding a computer screen from a keyboard; and
- rotating a wrist pad from a backside surface of the keyboard to a frontside surface of the keyboard.

20. The method as recited in claim 19, wherein said rotating further comprising extending at least one leg from the backside surface of the keyboard.

21. The method as recited in claim 19, wherein unfolding comprises separating the computer screen from the keyboard about an axis near a rearward surface of the computer.

22. The method as recited in claim 19, wherein rotating comprises actuating a bracket rotationally fastened to the wrist pad against a linkage for causing the linkage to draw the leg against a cam near the backside surface.

23. The method as recited in claim 20, further comprising, after said rotating, placing the leg and a portion of the backside surface of the keyboard vacated by the wrist pad against a working surface.

\* \* \* \* \*